(12) United States Patent
Schneider (10) Patent No.: US 9,474,419 B2
(45) Date of Patent: Oct. 25, 2016

(54) BLENDER TOOL SYSTEMS

(71) Applicant: Nate Schneider, St. Cloud, MN (US)

(72) Inventor: Nate Schneider, St. Cloud, MN (US)

(73) Assignee: Nate Schneider, St. Cloud, MN (US)

( * ) Notice: Subject to any disclaimer, the term of this patent is extended or adjusted under 35 U.S.C. 154(b) by 539 days.

(21) Appl. No.: 13/873,893

(22) Filed: Apr. 30, 2013

(65) Prior Publication Data

US 2014/0133263 A1    May 15, 2014

Related U.S. Application Data

(60) Provisional application No. 61/796,471, filed on Nov. 13, 2012.

(51) Int. Cl.
*A47J 43/28* (2006.01)
*G01F 19/00* (2006.01)

(52) U.S. Cl.
CPC ............. *A47J 43/288* (2013.01); *A47J 43/28* (2013.01); *G01F 19/002* (2013.01)

(58) Field of Classification Search
CPC ..... G01F 19/002; A47J 43/288; A47J 43/28; A47J 43/282
USPC ......................................... 366/129, 343, 342
See application file for complete search history.

(56) References Cited

U.S. PATENT DOCUMENTS

| | | | | |
|---|---|---|---|---|
| 1,412,536 | A * | 4/1922 | Mayer | 241/101.2 |
| D121,363 | S * | 7/1940 | Bryant, Sr. | D7/649 |
| 2,603,093 | A * | 7/1952 | Cordova | 73/427 |
| 2,612,352 | A * | 9/1952 | Singer | 366/349 |
| 2,637,537 | A * | 5/1953 | Ernst | 416/185 |
| 2,787,055 | A * | 4/1957 | Wertz | 30/123 |
| 2,853,780 | A * | 9/1958 | Bull | 30/327 |
| 3,049,014 | A * | 8/1962 | Aue | 73/426 |
| 3,088,345 | A * | 5/1963 | Campbell | 81/488 |
| 3,326,533 | A * | 6/1967 | Sturrup | 416/146 R |
| 3,369,407 | A * | 2/1968 | Hein | 73/427 |
| 3,417,972 | A * | 12/1968 | Vincent | 241/199.12 |
| 3,427,636 | A * | 2/1969 | Seifert | 15/105 |
| 3,765,275 | A * | 10/1973 | Johnson | 81/488 |
| 3,839,793 | A * | 10/1974 | Crapio | 30/123 |
| 3,895,548 | A * | 7/1975 | Sauve | 81/488 |
| 3,931,741 | A * | 1/1976 | Ceccarelli | 73/427 |
| 4,192,360 | A * | 3/1980 | Rodriquez | A61J 7/0053 141/24 |
| 4,250,771 | A * | 2/1981 | Berler | 81/487 |
| 4,268,080 | A * | 5/1981 | Lindley | 294/219 |
| D269,471 | S * | 6/1983 | Auerbach | D32/35 |
| 4,397,427 | A * | 8/1983 | Howard | 241/30 |
| D292,835 | S * | 11/1987 | Schaber | D32/35 |
| 4,719,702 | A * | 1/1988 | Hoffman | 30/326 |
| 4,745,642 | A * | 5/1988 | Shands | 4/661 |
| D308,277 | S * | 5/1990 | Walker | D99/34 |
| D339,036 | S * | 9/1993 | McDaniel | D7/653 |
| 5,302,021 | A * | 4/1994 | Jennett et al. | 366/348 |
| D354,896 | S * | 1/1995 | Lordier | D8/19 |
| 5,377,879 | A * | 1/1995 | Isaacs | 222/205 |
| 5,404,596 | A * | 4/1995 | Coory | 4/287 |

(Continued)

*Primary Examiner* — Tony G Soohoo
(74) *Attorney, Agent, or Firm* — Norton Rose Fulbright US LLP (57) ABSTRACT

A blender tool for manipulating material in a blender container is disclosed. The blender tool has a substantially flat end for tamping down blended material in a blender container. The blender tool further includes a collar for limiting the insertion depth of the tool. Additionally, the blender tool may include a cavity for collecting and/or measuring material.

8 Claims, 6 Drawing Sheets

(56) References Cited

U.S. PATENT DOCUMENTS

| | | | |
|---|---|---|---|
| 5,473,782 A * | 12/1995 | Coakley | 4/295 |
| 5,488,749 A * | 2/1996 | Pearce et al. | 15/105 |
| D372,650 S * | 8/1996 | Bundy | D8/14 |
| D376,515 S * | 12/1996 | Powers | D7/691 |
| 5,617,605 A * | 4/1997 | Hoerner et al. | 15/105 |
| 5,662,032 A * | 9/1997 | Baratta | 99/513 |
| D398,104 S * | 9/1998 | Raines | D32/35 |
| D405,661 S * | 2/1999 | Erickson | D7/688 |
| 6,134,790 A * | 10/2000 | Watson | 30/326 |
| D436,810 S * | 1/2001 | Slater | D7/688 |
| D437,747 S * | 2/2001 | Kwok | D7/682 |
| 6,454,455 B1* | 9/2002 | Jungvig | 366/129 |
| D473,421 S * | 4/2003 | Daniels, Jr. | D7/378 |
| D474,065 S * | 5/2003 | Daniels, Jr. | D7/378 |
| D474,067 S * | 5/2003 | Daniels, Jr. | D7/386 |
| 6,718,852 B1* | 4/2004 | Bickel et al. | 81/488 |
| D491,420 S * | 6/2004 | Shibata et al. | D7/653 |
| D495,926 S * | 9/2004 | Nikkhah | D7/412 |
| D496,833 S * | 10/2004 | Lantz | D7/653 |
| 6,966,689 B2* | 11/2005 | Daniels, Jr. | 366/192 |
| 7,278,779 B2* | 10/2007 | Beesley et al. | 366/205 |
| D592,019 S * | 5/2009 | Holcomb et al. | D7/643 |
| 7,648,264 B2* | 1/2010 | Breviere et al. | 366/205 |
| D641,595 S * | 7/2011 | Matari | D7/653 |
| D666,056 S * | 8/2012 | Boozer et al. | D7/412 |
| D695,361 S * | 12/2013 | Roehrig et al. | D21/525 |
| 2002/0080678 A1* | 6/2002 | Daniels, Jr. | 366/205 |
| 2004/0194322 A1* | 10/2004 | Bullard et al. | 30/286 |
| 2004/0264294 A1* | 12/2004 | Pryor, Jr. | 366/129 |
| 2005/0018532 A1* | 1/2005 | Nikkhah | 366/129 |
| 2006/0209630 A1* | 9/2006 | Brown et al. | 366/342 |
| 2007/0071843 A1* | 3/2007 | Jackson et al. | 425/276 |
| 2008/0223997 A1* | 9/2008 | Peterson | 248/176.1 |
| 2010/0107893 A1* | 5/2010 | Goodrick-Meech | A47J 43/046 99/348 |
| 2014/0104974 A1* | 4/2014 | Choi | A47J 43/0722 366/142 |
| 2014/0133263 A1* | 5/2014 | Schneider | 366/129 |

* cited by examiner

BLENDER TOOL SYSTEMS

CROSS-REFERENCE TO RELATED APPLICATIONS

The present application is related to and claims priority from prior provisional application Ser. No. 61/796,471, filed Nov. 13, 2012, the contents of which are incorporated herein by this reference and are not admitted to be prior art with respect to the present invention by the mention in this cross-reference section.

TECHNICAL FIELD

The present invention relates to providing a system for the improved operation of blenders. More particularly, the present invention relates to providing a system for moving material (including tamping), mixing material (including stirring), scraping material, preventing cavitation, adding material, measuring material, removing material, and/or any combination thereof, from a blender using a specially configured blender tool.

BACKGROUND OF THE INVENTION

Moving and mixing portions of material (such as, for example, blended food material), from a blender container using a conventional rubber spatula for scraping, a spoon for sampling, or a measuring spoon for measuring is problematic since, among other problems, the blender cover must be removed. Without the blender container lid attached, the blender cannot be operated without the blended material potentially exiting the blender container. Further, operating the blender without the lid (also known as cover, etc.) creates a safety risk, as kitchen tools or other foreign object debris may fall into the turning blender blades. Additionally, previous blender implements lack an effective way to measure ingredients, scoop ingredients, and/or scrape material from the container, especially when the blender container lid is in place. Moreover, no single blender tool performs all these tasks in one implement. No simple, inexpensive tool exists to move material (including tamping), mix material in the blender container (including stirring), scrape material in the blender container (including squeegeeing), prevent cavitation of blending material in the blender container, add material to the blender container, measure material and/or remove material from blender containers.

OBJECTS AND FEATURES

A primary object and feature is to provide a blender tool system which solves the above-mentioned problems.

It is a further object and feature to provide such a blender tool system with a scraping edge that is structured and arranged to move material from a wall of a blender container.

It is a further object and feature to provide such a blender tool system with a cavity region that is structured and arranged to hold material, including liquids, allowing material to be added or removed from the blender container.

It is a further object and feature to provide such a blender tool system with a cavity region that is structured and arranged to measure material, allowing a quantifiable amount of material to be added or removed from the blender container.

It is a further object and feature to provide such a blender tool system that can be inexpensively manufactured.

It is a further object and feature to provide such a blender tool system that has a flat surface that prevents the tool from rolling off a countertop (or any generally flat surface).

It is a further object and feature to provide such a blender tool system that is constructed out of components that are safe to be used in the preparation of food. It is a further object and feature of the present invention to provide such a blender tool system that is dishwasher safe.

A further primary object and feature is to provide such a system that is efficient, inexpensive, and handy. Other objects and features of this invention will become apparent with reference to the following descriptions.

BRIEF SUMMARY

In accordance with a preferred embodiment hereof, this disclosure teaches a blender tool system, relating to manipulating material within at least one container, having at least one internal sidewall, through at least one container lid with an opening, the tool system comprising a means for gripping the tool system, a means for extending the tool system into such at least one container through such at least one container lid with an opening, a means for tamping material within such at least one container, and a means for providing at least one cavity to collect material. The tool system further comprises a means for moving material collected along at least one internal wall of at least one container and a means for limiting insertion of said tool system into such at least one container lid.

In accordance with a preferred embodiment hereof, this disclosure teaches a tool system intended for manipulating material within at least one container having at least one internal sidewall, through at least one container lid with an opening, the tool system comprising at least one handle structured and arranged substantially at one end of said tool system, at least one shaft connected to said handle, at least one collar structured and arranged to extend out from the axis of said shaft, and in which the at least one collar limits the depth of insertion of said at least one shaft into a blender container and has a radius greater than said at least one shaft, and wherein said at least one shaft further comprises at least one cavity for collecting material.

In accordance with a preferred embodiment hereof, this disclosure teaches a method for manipulating material with at least one tool system through at least one container lid with an opening, the material positioned within at least one container having at least one internal sidewall, the method comprising the steps of gripping said at least one tool system tamping material within at least one container with said at least one tool system, wherein said at least one tool system is comprised of at least one handle structured and arranged substantially at one end of said tool system, at least one shaft connected to said handle, and at least one collar structured and arranged to extend out from the axis of said shaft and has a radius larger than said at least one shaft, and at least one cavity for collecting material within said at least one shaft.

DETAILED DESCRIPTION

The present blender tool system provides a blender implement that incorporates a spatula, measuring scoop, and tamper, along with a collar for convenient storage. The tool has a flat bottom that has one or more straight edges to prevent rolling of the tamper stick when placed on a flat counter. The flat bottom further assists in pushing material along the side of a container by providing a squeegee-like connection to provide ease of pulling material out of a container after blending. The collar allows the implement to be stored within the blender container when the blender is not being used. By combining the spatula with a flat bottom, along with an interval-measuring scoop, the blender tool system integrates no less than three tools into one. By combining the three tools, the blender tool system provides the end user with an anti-roll tamper stick, which includes the ability to push ingredients up and down with ease while still being able to function as a spatula.

Figure 1:
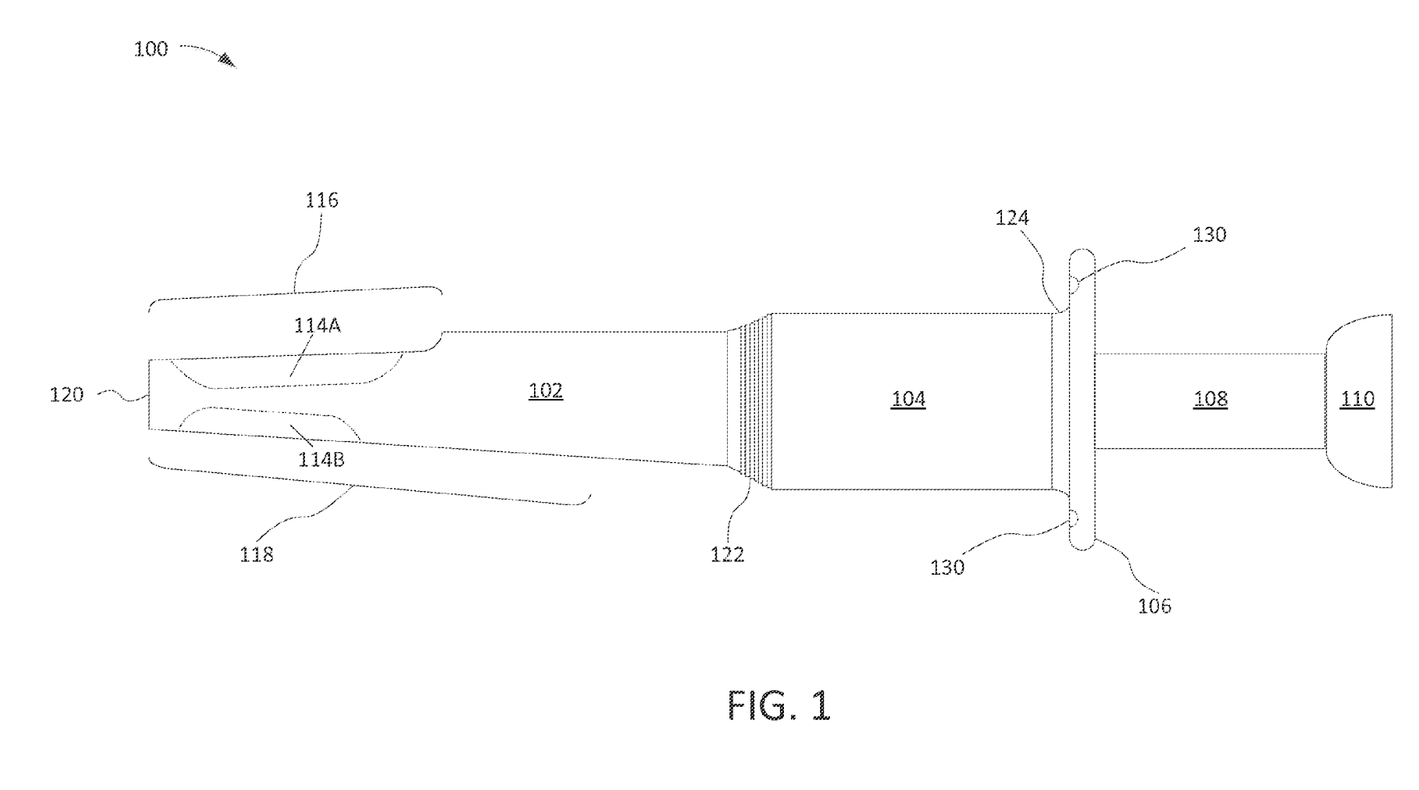
FIG. 1 shows a side elevational view of a blender tool system according to a preferred embodiment of the present invention.

FIG. 1 illustrates a side elevational view of blender tool system 100 according to a preferred embodiment. Preferably, blender tool system 100 comprises handle 108, collar 106, and shaft 102, as shown. Preferably, blender tool system 100 is structured and arranged to work through an aperture in a blender container lid. Frequently, an aperture in a blender container lid is a centered, concentric opening of approximately two inches. The shape of an aperture is generally circular, but may also be any other shape, including without limitation elliptical, square, octagon, or square with rounded corners. Blender tool system 100 is structured and arranged to insert shaft 102 into the aperture of a blender container lid. Collar 106 is structured and arranged with a diameter larger than the blender container lid aperture, thereby limiting the depth of insertion of blender tool system 100 into a blender container by physical contact with the blender container lid. Collar 106 also allows blender tool system 100 to be stored within the blender container lid while the lid is attached on top of the blender container.

Preferably, blender tool system 100 is constructed with a food-grade material. Suitable food-grade materials may include without limitation food-grade plastics, food-grade rubbers, food-grade polymers (including nylon-type materials), food-grade acrylics, food-grade silicon materials, and/or any combination thereof. Preferably, suitable food-grade plastics, rubbers, silicon, acrylics, and/or polymers are free of Bisphenol A ("BPA"). Preferably, blender tool system 100 is one monolithic piece, as shown (at least embodying herein wherein such tool system consists essentially of one monolithic piece). Alternately preferably, an internal rigid internal member, for example a rigid plastic or metal, may be used to provide sufficient rigidity and provide structural integrity, not shown. If a material is used that is not suitable for exposure with food, for example a porous material or a metal susceptible to corrosion, a coating may be used to coat supporter 104, shaft 102, handle 108, collar 106, any other surface of blender tool system 100, and/or any combination thereof. Preferably, a food-grade plastic coating, a food-grade rubber coating, a food-grade polymer coating (e.g., nylon, etc.), a food-grade enamel coating, a food-grade silicon coating, and/or a food-grade PTFE coating would allow non-food grade components to be used for food preparation. Further, such coatings would allow blender tool system 100 to be submersed in water or washed in a dishwasher without damage to the tool system. In a further embodiment, separate coatings may be used for different components. For example, a softer and/or rubber material may comprise the outer surface of handle 108, making it more comfortable for use with bare hands and also improving grip if the handle is wet. Upon reading the teachings of this specification, those with ordinary skill in the art will now understand that, under appropriate circumstances, considering such issues as user preference, cost of manufacture, etc., other manufacturing methods and material arrangements, such as, for example, using materials other than plastic (such as for example, metal, wood, carbon-fiber, using multiple different materials, etc.), injection-molding the tool, punching or cutting the tool from a sheet, assembling pieces rather than casting entire blender tool system as one monolithic piece, etc., may suffice.

Preferably, handle 108 is structured and arranged to allow a user to grasp blender tool system 100 with one hand (e.g., using a baseball-type grip). Preferably, handle 108 is substantially round, as shown (at least embodying herein first means for gripping said tool system). Handle 108 may include textures and/or contours to improve the user's grip. Preferably, handle 108 further comprises handle flare 110. Preferably, handle flare 110 comprises extra material thickness, resulting in a larger diameter than handle 108, as shown. Handle flare 110 prevents the user's hand from slipping when using handle 108. Further, handle flare 110 provides, as an alternate position, a place to grip blender tool system 100 from the end. This alternate position may be preferred for tamping material in the blender container. Upon reading the teachings of this specification, those with ordinary skill in the art will now understand that, under appropriate circumstances, considering such issues as user preference, cost of manufacture, then materials available, etc., other handle or handle flare arrangements, such as, for example, handles or handle flares comprising different materials (such as, for example, metal, etc.), handles or handle flares comprising different shapes (such as, for example, a ball/sphere shape, a T-handle shape, etc.) in addition to, or instead of, the depicted shape, may suffice.

Preferably, collar 106 is substantially round, as shown, which allows the collar to fit a variety of blender container lids (at least embodying herein sixth means for limiting insertion of said tool system into such at least one container lid). Collar 106 creates a seal with the blender container lid, preventing material from exiting the blender container when the blender is operating. Further, collar 106 is structured and arranged to prevent shaft 102 or distal end 120 from contacting the operating portion (e.g., blades) of the blender. Preferably, collar 106 also includes a drip trench 130 for collecting material that runs down shaft 102 and/or supporter 104 when the tool system 100 is held handle side downwards. Preferably, drip trench 130 encircles completely around collar 106 and is substantially concentric with the axis of collar 106, itself substantially concentric with the axis of handle 108 and/or supporter 104. Upon reading the teachings of this specification, those with ordinary skill in the art will now understand that, under appropriate circumstances, considering such issues as user preference, cost of manufacture, then materials available, etc., other collar arrangements, such as, for example, collars with different shapes, collars with different diameters, collars with different thicknesses, collars made with different material (such as, for example, resilient material, for example, rubber, etc.), etc., may suffice.

Preferably, shaft 102 provides the majority of the length of blender tool system 100 that extends into a blender container (at least embodying herein second means for extending said tool system into such at least one container through such at least one container lid with an opening). Preferably, shaft 102 further comprises a distal end 120 (at least embodying herein third means for tamping material within such at least one container), a front flat face 116, and/or a back flat face 118. Preferably, shaft 102 is generally a conical or cylindrical shape, or any combination thereof. Shaft 102 is structured and arranged to allow a user to tamp material in a blender container with distal end 120, mix (or stir) material in a blender material. Shaft 102 is sufficiently rigid to prevent bending (or flexing) when used to mix (stir) or tamp material in a blender container. Preferably, shaft 102 is structured and arranged with sufficient size to prevent the cavitation of air in the center of the blender container during operation. During operation of a blender, material generally flows laterally away from the blender blades, out towards the blender container sidewalls, then flows upwards, and returns towards the center of the container above the blades. This flow frequently creates an air pocket in the center of the blender container, directly above the blender blades. If the air pocket is sufficiently large, the air will be pulled into the blender blade region, creating cavitation. Preferably, shaft 102 is structured and arranged to fill this air pocket region, preventing the air pocket cavitation of the blender blades. Preferably, collar 106 is located to allow shaft 102 to fill an air pocket region but yet preclude shaft 102 from contacting the blender blades. Upon reading the teachings of this specification, those with ordinary skill in the art will now understand that, under appropriate circumstances, considering such issues as user preference, cost of manufacture, then materials available, etc., other shaft arrangements, such as, for example, shafts comprising different materials (such as, for example, metal, etc.), shafts comprising different shapes (such as, for example, a square, rectangular, triangle, diamond, etc.) in addition to, or instead of, a conical and/or cylindrical shape, may suffice.

Preferably, blender tool system 100 further comprises supporter 104, preferably positioned between shaft 102 and collar 106. Supporter 104 is structured and arranged to fit into the aperture in a blender container lid. The diameter of supporter 104 allows for the insertion of supporter 104 into the aperture of a blender container lid but yet maximizes the diameter of supporter 104 to reduce excess free play between supporter 104 and the aperture of the blender container lid. It may be preferred to leave enough space between the radius of an aperture of the blender container lid and the radius of supporter 104 (when supporter 104 is inserted into the aperture) to allow blender tool system 100 to angle enough to allow distal end 120 to contact the sidewall of the blender container. It is understood that the diameter and shape of supporter 104 will be tailored in order to fit the variety of aperture sizes and/or shapes of proprietary blender container lids. Collar 106 prevents blender tool system 100 from inserting into the blender container beyond supporter 104. Preferably, supporter 104 is either cylindrical or conical, or a combination of both. However, the shape and size of supporter 104 is predominately based upon the shape and/or size of the aperture in a proprietary blender container lid. As such, upon reading the teachings of this specification, those with ordinary skill in the art will now understand that, under appropriate circumstances, considering such issues as user preference, cost of manufacture, then materials available, etc., other supporter arrangements, such as, for example, supporters with different shapes, supporters lined with different material (such as, for example, resilient material, for example, rubber, etc.), etc., may suffice. Preferably, shaft neck 122 and collar neck 124 provide transitions between shaft 102, supporter 104, and/or collar 106. Shaft neck 122 provides a reduction in diameter between shaft 102 and supporter 104. This reduction in diameter provides additional space between a blender container lid aperture and blender tool system 100. This space allows the user to angle blender tool system 100 to reach different areas of the blender container. Preferably, shaft neck 122 provides a depth limitation, like collar 106, for use with smaller apertures, which may be used with smaller blender containers to prevent blender tool system 100 from contacting the blender blades. For example, a shorter 32 ounce blender container may include a blender container lid with an aperture that only allows shaft 102 to insert up to shaft neck 122, while a taller 64 ounce blender container may include a blender container lid with an aperture large enough so that shaft 102 and/or supporter 104 may insert up to collar 106. Alternately preferred, additional necks with an intermediate diameter between that of shaft 102 and supporter 104 may be included for providing additional limiting depths. Collar neck 124 further prevents lateral movement of blender tool system 100 when it is resting on top of the blender container lid.

The following are preferred dimensions for a preferred embodiment of blender tool system 100 for use in conjunction with a blender 300 having a blender container lid aperture diameter D2 of about 5 centimeters (such as, for example, a standard Vita-mix blender container lid aperture). Preferably, blender tool system 100 has a supporter 104 diameter D1 of about 3.5 centimeters to about 5.0 centimeters. Most preferably, blender tool system 100 has a supporter 104 diameter D1 of about 4.5 centimeters (at least embodying herein wherein such at least one first diameter distance is substantially 4.5 centimeters), as related to apertures that are frequently used with 64 ounce blender container lids. Preferably blender tool system 100 has a length from distal end 120 to collar 106, as shown best in FIG. 1, of about 24 centimeters. Preferably, blender tool system 100 has a tool length, as shown in FIG. 1, from shaft tip 118 to handle flare 110, of about 25 to 40 centimeters. Upon reading the teachings of this specification, those with ordinary skill in the art will now understand that, under appropriate circumstances, considering such issues as user preference, cost of manufacture, then materials available, etc., other dimensional arrangements, such as, for example larger or smaller dimensions, different radii (such as, 1 inch through 4 inches, etc.), larger or smaller shaft, collar, or supporter widths, etc., may suffice.

Alternately preferred, handle 108 or handle flare 110 comprises a hanger, not shown. Preferably hanger is located in handle 108 or handle flare 110, not shown (at least embodying herein wherein such first means further comprises eighth means for hanging the blender tool system). Preferably hanger comprises an aperture, which is preferably adapted to permit blender tool system 100 to be hung from a hook (at least embodying herein wherein such hanging means comprises at least one aperture). Upon reading the teachings of this specification, those with ordinary skill in the art will now understand that, under appropriate circumstances, considering such issues as user preference, cost of manufacture, then materials and techniques available, etc., other hanger arrangements, such as, for example, notches, hooks, loops, etc., may suffice.

Alternately preferred, supporter 104, neck 122, neck 124, and/or collar 106 may have retainers for securing blender tool system 100 to a blender container lid, not shown. Retainers may include a threaded region, tabs, protrusions, or other interlocking designs for locking blender tool system 100 into a container lid, etc., not shown.

Figure 2:
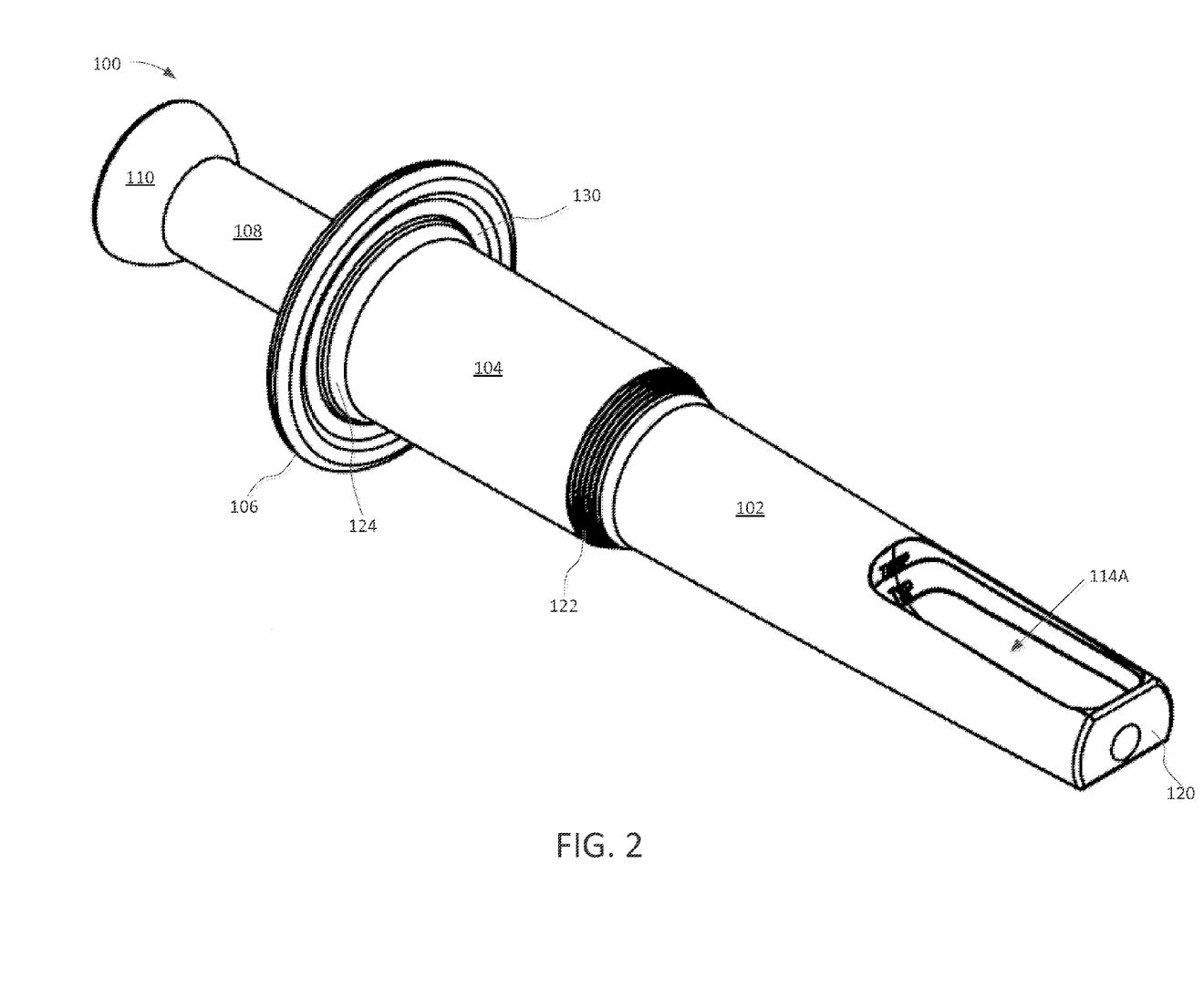
FIG. 2 shows a perspective view of the blender tool system of FIG. 1, illustrating a front face and one side view.

FIG. 2 shows a perspective view of the front face of blender tool system 100 according to a preferred embodiment of the present invention. Preferably, blender tool system 100 may be used to scoop material into and out of the blender container. Preferably, user 102 grips handle 108 and scoops material into cavity 114A, as shown, (or 114B on the backside) (at least embodying herein fourth means for providing at least one cavity to collect material). If the material is dry, the flat region 116 easily allows excess material to be scraped off, providing a quantifiable amount of material (at least embodying herein seventh means for measuring material). Intermediate measure lines 144 provide the ability to measure smaller amounts of material, as shown. Preferably, distal end 120 is generally substantially flat, as shown. The substantially flat feature of distal end 120 allows blender tool system 100 to effectively tamp down material being blended in a blender container. Preferably, the outer perimeter of distal end 120 is comprised of round outer side walls from shaft 102, but is also comprised of the substantially flat sections of front shaft face 116 and back shaft face 118. Preferably, intermediate measure lines, such as U.S. units of measure tablespoon ("TBSP") and teaspoon ("TSP"), are provided within cavity 114A and/or 114B. It is understood that other units of measure are suitable, including metric.

Figure 3:
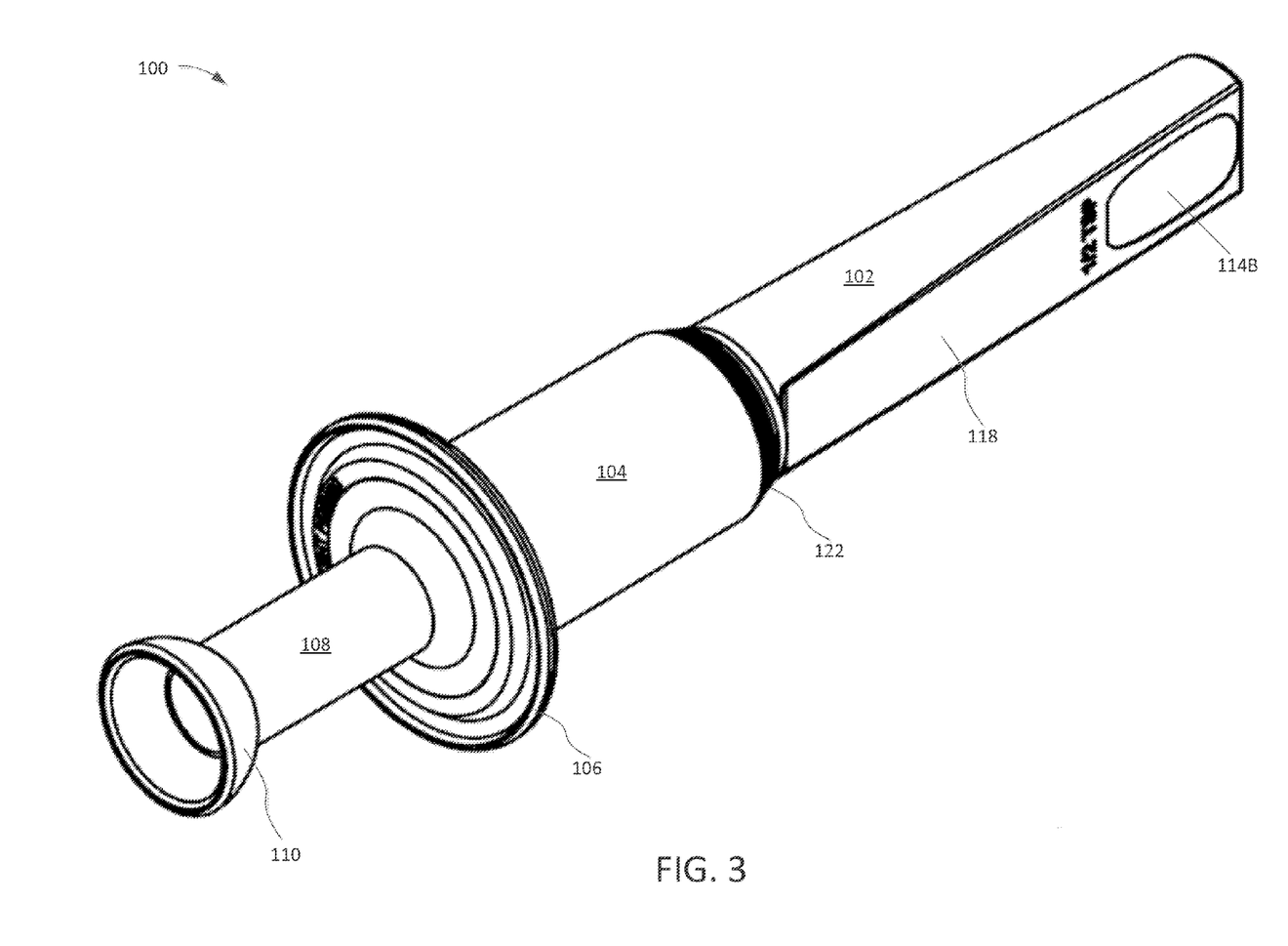
FIG. 3 shows a perspective view of the blender tool system of FIG. 1, illustrating a back face and one side view.

FIG. 3 shows a perspective view of the back face of blender tool system 100 according to a preferred embodiment of the present invention. Preferably, back shaft face 118 is substantially flat, as shown. The substantially flat feature of back shaft face 118 prevents blender tool system 100 from rolling off the countertop when not in use in a blender, as shown. The substantially flat feature of back shaft face 118 allows blender tool system to scrape and/or squeegee material from a blender container that has substantially flat sidewalls. (at least embodying herein fifth means for moving material collected along at least one internal wall of such at least one container) Alternately preferred, back shaft face 118 may have an arcuate shape to conform to blenders with substantially rounded side walls. Collar 106 may also incorporate a flat section in the outer perimeter to prevent rolling of blender tool system 100, not shown, especially if back shaft face 118 is not substantially flat. Preferably, the substantially flat feature of back shaft face 118 also provides more pronounced corners at the intersection formed between the cylindrical side wall of shaft 102 and back shaft face 118. For example, as shown, back shaft face 118 extends to shaft neck 122. Alternately, back shaft face 118 may extend all the way to collar 106 when a supporter 104 is not incorporated. Alternately, back shaft face 118 may continue past shaft neck 122 into supporter 104. Pronounced corners improve the ability of blender tool system 100 to scrap (or squeegee) the sidewall of a blender container, as shown.

Alternately preferred, extra material may be added to corners to create scraping and/or squeegee flares that further provide a scarping and/or squeegee effect, not shown. Rigid material may provide a scraping effect while softer, rubbery material may provide a squeegee effect. Additionally, scraping and/or squeegee flares may be added at locations other than the corners, for example, on each side of shaft 102, preferably at an intermediate position between front shaft face 116 and back shaft 118. Flares may also be incorporated onto distal end 120 for improved tamping capability. Multiple flares may be used to add squeegee and/or scraping capability, similar to multiple bladed windshield wipers. Scraping and/or squeegee flares may extend from distal end 120 for a short distance or all the way to shaft neck 122 or collar 106.

Figures 4A, 4B, 4C:
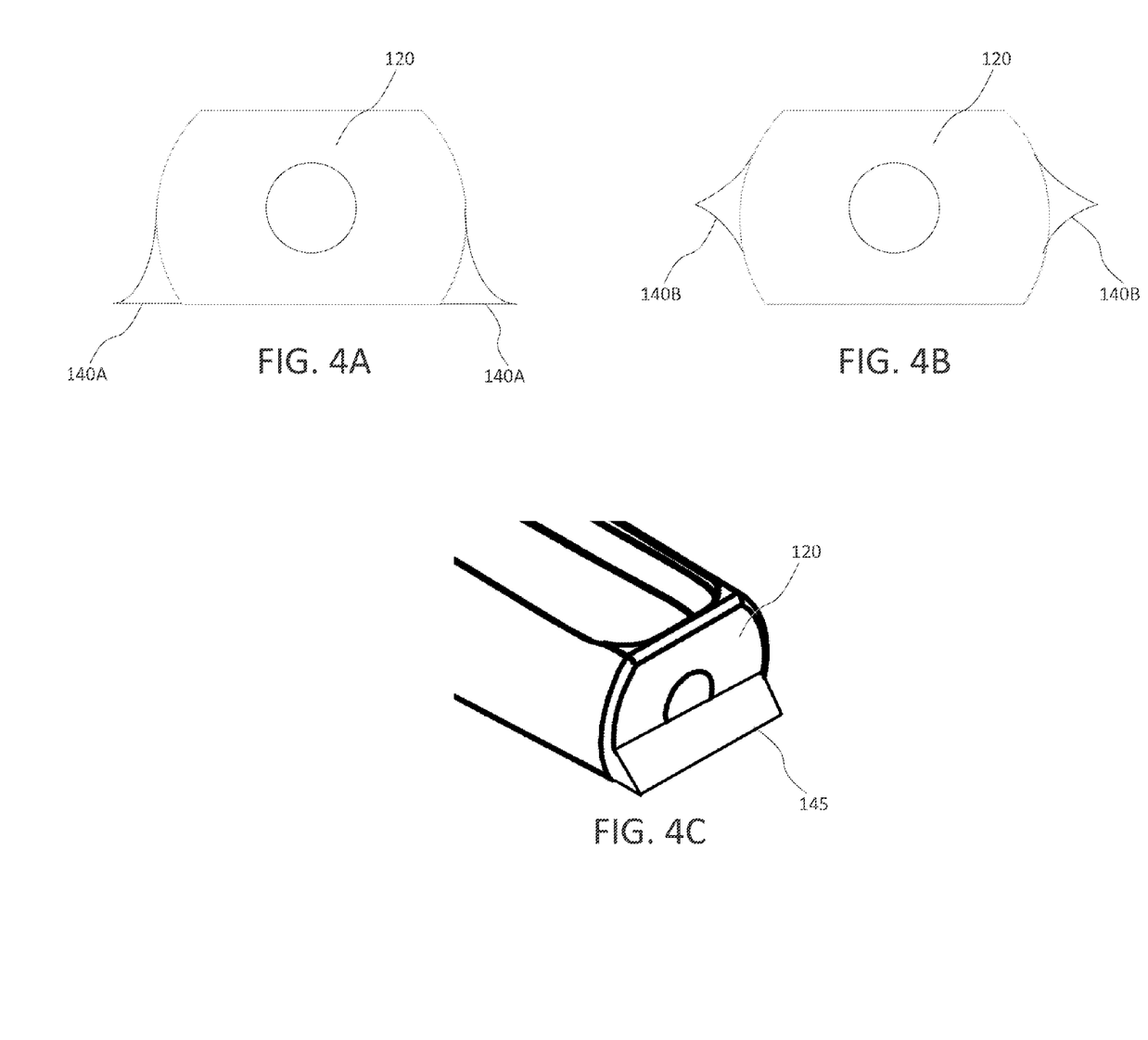
FIGS. 4A-C show various end views of the blender tool system according to alternate embodiments.

FIGS. 4A-B show a bird's eye view of the distal end 120 of blender tool system 100 according to an alternate embodiment of the present invention. Collar 106 and supporter 104 are not depicted. Alternately preferred, shaft 102 may include one or more flares, 140A, 140B, and/or 145, for assisting in scraping and/or squeegeeing, as shown. The flares may be a small ridge, about a tenth (1/10) of an inch, or they may extend outwards from the shaft 102 axis more than an inch, similar to a rubber/silicon spatula. Flares may be comprised of a soft material, for squeegeeing the internal walls of a blender container, or a rigid material, for scraping the internal walls of a blender container. Flares may run along shaft 102 towards collar 106, as shown by flare 140A and flare 140B, along the distal end 120, as shown by flare 145, and/or any combination thereof. Flares 140A extend from the intersection created by a flat face (e.g., 116 or 118) and the rounded walls of shaft 102. However, flares may also be located in intermediate positions along shaft 102, as shown by flares 140B. Flares 140A and 140B may be used in combination. Flares may also be incorporated to protrude from distal end 120, as shown in one exemplary arrangement by flare 145 in FIG. 4C. Flare 145 assists in pushing material down a side wall of a blender container. Flare 145 may be continuous with flares 140A.

Figure 5:
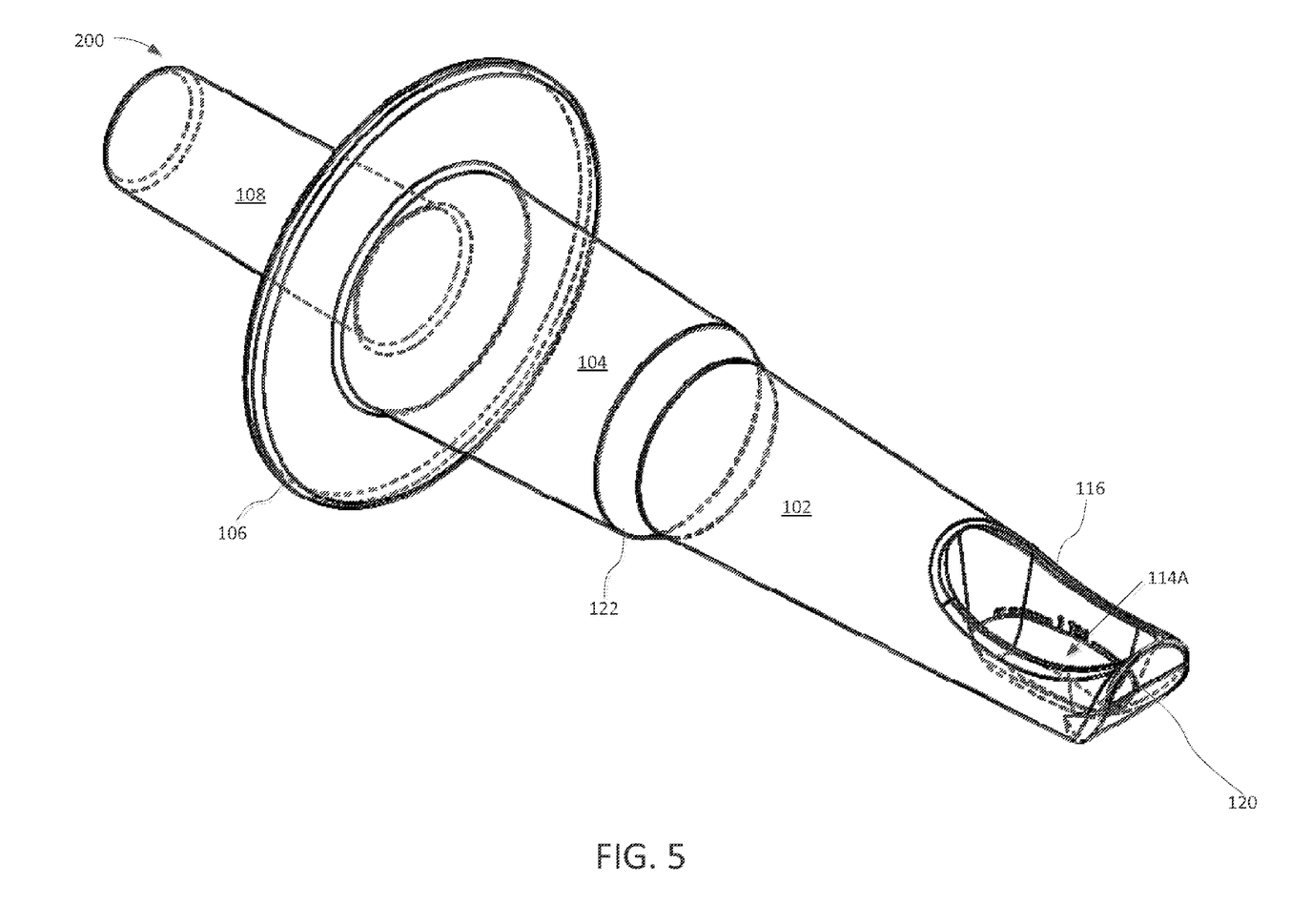
FIG. 5 shows a perspective view of a blender tool system according to an alternate preferred embodiment.

FIG. 5 shows a perspective side view of the blender tool system 200 according to an alternate preferred embodiment of the present invention. In this alternate embodiment, front shaft face 116 has a generally arcuate shape, providing a preferred scooping shape to cavity 114A. Preferably, the arcuate scooping shape of cavity 114A allows blender tool system 200 to function as a scoop, such as an ice cream scoop or similar food scoop.

Figure 6:
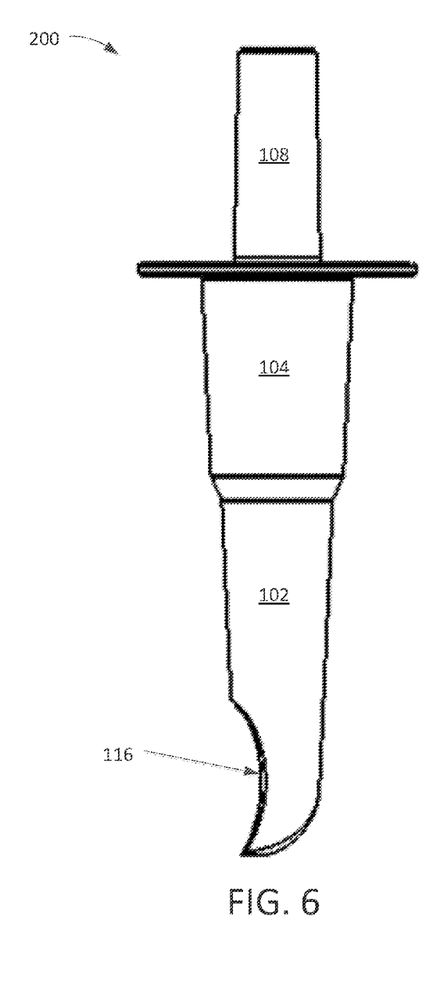
FIG. 6 shows a side elevational view of a blender tool system according to an alternate preferred embodiment of FIG. 6.

FIG. 6 shows a side elevational view of the blender tool system 200 according to an alternately preferred embodiment of the present invention. The arcuate scooping shape of 116 is shown. The embodiment also illustrates that handle flare 110 is optional.

Upon reading the teachings of this specification, those with ordinary skill in the art will now understand that, under appropriate circumstances, considering such issues as user preference, etc., providing for use of blender tool system 100 with containers other than a blender, such as, for example, other substantially round cylindrical containers, such as, for example, pans, pots, other small, kitchen appliances, etc., may suffice. Further, it should be understood that the blended material, should not be limited to food.

Although applicant has described applicant's preferred embodiments, it will be understood that the broadest scope of this invention includes modifications such as diverse shapes, sizes, and materials. Such scope is limited only by the below claims and not the illustrated features of the exemplary embodiments.

Further, many other advantages of applicant's invention will be apparent to those skilled in the art from the above descriptions and the below claims.

What is claimed is:

1. A tool system, relating to manipulating material within at least one container having at least one internal sidewall, through at least one container lid with an opening, the tool system comprising:

a supporter;

a first shaft connected to the supporter, the first shaft further comprising a distal end of the tool system;

a handle, arranged at the end of the tool system opposite of the distal end;

a collar; and a cavity;

wherein the supporter is a second shaft arranged between the handle and the first shaft, and wherein the supporter has a diameter larger than the first shaft;

wherein the collar is arranged between the supporter and the handle, wherein the collar is configured to extend out from the axis of the supporter, and wherein said collar limits the depth of insertion of the supporter and the first shaft into a blender container and has a radius greater than the supporter and the first shaft;

wherein the first shaft has a first diameter at the end connected to the supporter and a second diameter at the distal end, in which the second diameter is smaller than the first diameter, and wherein the diameter of the first shaft continuously tapers from the first diameter to the second diameter; and wherein the first shaft includes the cavity between the end connected to the supporter and distal end, wherein the cavity is configured within the diameter of the first shaft, and wherein the cavity is configured to hold liquids.

2. The tool system according to claim 1, wherein the cavity has greater than a 0.25 teaspoon volume.

3. The tool system according to claim 1, wherein said tool system consists essentially of one monolithic piece.

4. The tool system according to claim 1, wherein said tool system further comprises at least one flare arranged at the distal end.

5. The tool system according to claim 4, wherein said at least one flare is comprised of at least one of the following: silicon, plastic, metal, acrylic, and rubber.

6. The tool system according to claim 1, wherein said at least one handle further comprises at least one handle flare.

7. The tool system of claim 1, wherein a length of the first shaft between the distal end and the end connected to the supporter comprises at least one substantially first flat surface;

wherein the first flat surface is substantially perpendicular to the distal end, and wherein the cavity is configured within the substantially flat surface.

8. The tool system of claim 1, wherein the cavity further comprises intermediate measure lines.

* * * * *